United States Patent
Ichikawa et al.

[11] Patent Number: 6,032,377
[45] Date of Patent: Mar. 7, 2000

[54] NON-SPHERICAL SURFACE SHAPE MEASURING DEVICE

[75] Inventors: Hajime Ichikawa; Takahiro Yamamoto, both of Kanagawa-ken, Japan

[73] Assignee: Nikon Corporation, Tokyo, Japan

[21] Appl. No.: 09/003,887

[22] Filed: Jan. 7, 1998

[30] Foreign Application Priority Data

Jan. 7, 1997 [JP] Japan .................................. 9-000703
Oct. 23, 1997 [JP] Japan .................................. 9-290814

[51] Int. Cl.$^7$ .................................................. G01B 11/24
[52] U.S. Cl. ................................ 33/554; 33/28; 33/507
[58] Field of Search ........................ 33/554, 28, 507, 33/200, 545, 546, 547, 549, 550, 551, 553, 555, 503; 356/376, 377, 124, 359; 250/559.22

[56] References Cited

U.S. PATENT DOCUMENTS

| | | | |
|---|---|---|---|
| 3,400,463 | 9/1968 | Barringer | 33/546 |
| 4,914,827 | 4/1990 | Cook | 33/554 |
| 5,283,630 | 2/1994 | Yoshizumi | 33/547 |
| 5,886,775 | 3/1999 | Houser et al. | 356/4.01 |

*Primary Examiner*—Christopher W. Fulton
*Attorney, Agent, or Firm*—Morgan, Lewis & Bockius LLP

[57] ABSTRACT

A non-spherical surface shape measuring device and method that measures the shapes of object surfaces that have rotationally symmetrical non-spherical surface shapes on the basis of relative deviation values from the shape of a reference surface, the non-spherical surface shape measuring device includes a measuring means for obtaining relative deviation values between a reference surface and an object surface by measuring corresponding sampling points on the surfaces of the reference surface and the object surface and storing predetermined coefficients of variables prior to measurement. A first operating means approximates the partial differential coefficients for the predetermined variables and models the relative displacement, between the object surface and the reference surface and the XY-coordinates of the sampling points, into functional equivalents of the partial differential coefficients. A second operating means approximates the relative displacement between the object surface and the reference surface and a third operating means corrects the relative deviation values according to the relative displacement approximated by the second operating means.

42 Claims, 4 Drawing Sheets

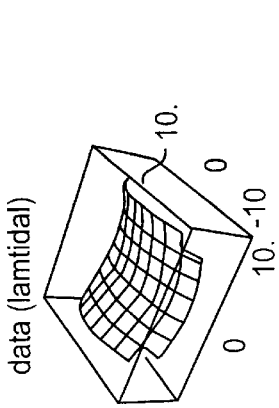

```
kv1= 1.0;      kv1= 32.6
kv2= 1.0;      kv2= 32.6
kvd= 1.0;      kvd= 32.6 c02v1=zero
c02v2=zero
c02vd=zero c04v1=-0.2*10^-4;
c04v2=-0.2*10^-4;
c04vd=-0.2*10^-4;

c06v1=-0.2*10^-8;
c06v2=-0.2*10^-8;
c06vd=-0.2*10^-8;

c08v1=-0.2*10^-11;
c08v2=-0.2*10^-11;
c08vd=-0.2*10^-11;

c10v1=zero
c10v2=zero
c10vd=zero txv1= toff;                   tyv1= toff;
txv2=-0.0001000005;  tyv2=-0.0000000015;

shixv1= 0.000;    shiyv1= 0.00000;
shixv2= 0.004;    shiyv2= 0.00004;
shixvd= 0.000;    shiyvd= 0.00000;

offset=0.020;
```

FIG. 3(A)

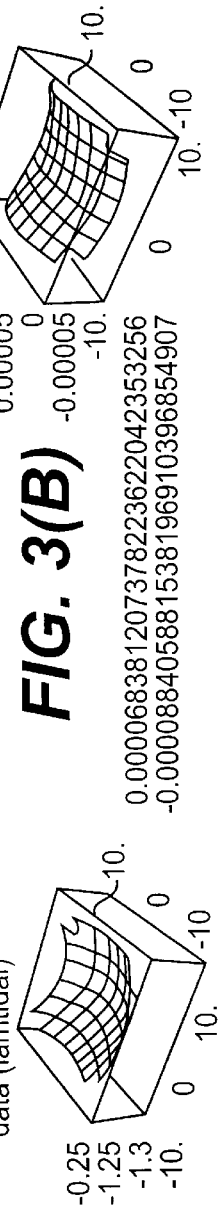

|  | |
|---|---|
| PISTON | offset -0.0010001401026111113505621390411125<br>piston -0.001<br>(offset) no goss -0.0481824111113505424330142 \ |
| Z-SHIFT | dpfit-0.0199365336339272275296072414917461023662259<br>dpv-0.02<br>(p) no gosa -0.0173316303638623519637923312694851687 \ |
| X-TILT | dtfit-0.000099997427799195351019939425894293301725 \<br>dtv-0.0001000005005<br>(t) no gosa -0.00030726854258581236391637916919131094 \ |
| Y-TILT | dthefit-1.30633086618278570015886645173534610501381 10<br>dthev-1.49995 10<br>(the) no gosa -0.126730636820274019725087618611494052 \ |
| X-TILT | dshiafit-0.003994426392026632853554768627493354929555 \<br>dshiav-0.0004<br>(shix) no gosa -0.002840199336746611407843124660267611 / |
| Y-SHIFT | dshiyfit-0.000039997578219180416499618476724282042280 11<br>dshiyv-0.004<br>(shiy) no gosa -0.006054376292958750953308189294894299 / |

FIG. 3(B)

NON-SPHERICAL SURFACE SHAPE MEASURING DEVICE

This application claims the benefit of Japanese Application No. 09-000703, filed on Jan. 7, 1997, which is hereby incorporated by reference.

BACKGROUND OF THE INVENTION

1. Field of the Invention

The present invention concerns a non-spherical surface measuring device that is used to measure, with a high degree of accuracy, the surface precision of non-spherical surfaces which have a rotationally symmetrical axis.

2. Discussion of the Related Art

The object surfaces to be examined and measured are surfaces that have a so-called higher-order non-spherical surface design shape in which the non-spherical surface shape can be expressed by Equation (1) as follows:

$$Z[\kappa, R, C_{02}, C_{04}, C_{06}, C_{08}, C_{10}, X, Y] =$$
$$(X^2 + Y^2)/R/\left[1 + \{1 - \kappa(X^2 + Y^2)/R^2\}^{1/2}\right] + C_{02}(X^2 + Y^2)^1 +$$
$$C_{04}(X^2 + Y^2)^2 + C_{06}(X^2 + Y^2)^3 + C_{08}(X^2 + Y^2)^4 + C_{10}(X^2 + Y^2)^5$$

In Equation (1), it is not necessary that the higher-order non-spherical surface coefficients $C_i$ be limited to 10 orders, and there is no loss of generality in the description that follows. Furthermore, the coefficient $\kappa$ indicates a conic coefficient and the coefficient R indicates the central curvature radius. In order to simplify the equation it is written in a notation which differs from the ordinary notation in that "$1+\kappa$" in the ordinary notation is replaced by "$\kappa$". Thus, for example, a parabolic surface, which is expressed as "$\kappa=-1$" in ordinary notation, is expressed as "$\kappa=0$" in the present specification.

Furthermore, in the present specification, the higher-order non-spherical surface coefficients $C_{02}$ through $C_{10}$, in Equation (1), are defined as higher-order terms. In regard to the second-order term with $C_{02}$ as a coefficient, since this is equivalent to $\kappa=0$ (when $\kappa=0$, the first term on the right side of Equation (1) and the second-order term which has $C_{02}$ as a coefficient are equivalent), $C_{02}$ may be omitted in some cases when a higher-order non-spherical surface shape is expressed. However, since higher-order non-spherical surfaces, which use a conical surface for which $\kappa$ does not equal 0 as a base, and which also include components of the $C_{02}$ term, $C_{02}$ will be included in the higher-order terms in the present invention. In this regard as well, there is no loss of generality in the following description.

It is known that where the components of the higher-order terms are small (i.e., in the case of micro-higher-order non-spherical surfaces), so-called "folded back null measurement" is possible. Generally, in interference measurements, it is known that apparent aberration, caused by alignment, cannot be avoided and that so-called alignment error correction is therefore necessary as a treatment for eliminating such aberration when high-precision measurements are to be performed.

Where higher-order terms cannot be ignored, or more precisely, where the number of interference fringes is so great that high-precision measurement is impossible, such as folded back null measurement, a higher-order non-spherical surface measurement method is used in which a null wave front is generated by means of a null lens or a zone plate element and interference measurements are performed without using the folded back configuration.

Currently, however, no appropriate method for correcting alignment error in the conventional measurement of higher-order non-spherical surfaces has been proposed. Also no appropriate method for the measurement of the wave front shape of the null wave front itself used in the measurement of higher-order non-spherical surfaces has been proposed.

For example, lenses with high-precision higher-order non-spherical surfaces are used in the exposure processes of semiconductor manufacturing processes. The method used to manufacture such high-precision lenses consists of a process in which highly uniform glass elements, which meet the required specifications, are cut to a prescribed size. The process further includes a grinding process, in which the cut elements are ground to a shape that is close to the final shape, a polishing process, in which the ground surfaces are finished to form polished surfaces. If the surface precision remains insufficient, a corrective polishing process is performed in accordance with measurement results. The measurement method used is basically an interferometer constructed as shown in FIG. 2. The polished non-spherical surface that is to be measured is set in a prescribed holding position relative to the interferometer and the surface precision is measured from the condition of the interference fringes produced. In this case, however, there is no guarantee that the object of measurement is set in the prescribed position. Specifically, since the measurement results conceivably include an alignment error, alignment is repeated and the 3D diagram obtained when the "RMS value calculated, as a result of measurement" reaches a minimum, is taken as the surface precision of the workpiece.

Repeated measurement is necessary in order to ascertain whether or not the value is actually the minimum value, so that the measurement time required is increased. Objective measurement is impossible, since there is a possibility that the measured values will differ depending on the technical skill of the measurer. Additionally, if a high detected surface precision is required, there are limits in terms of precision of the positioning that can be accomplished by hand.

Thus, time-consuming adjustment is required in order to reduce the alignment error of the lens and satisfactory measurement precision cannot be obtained even when such adjustment is performed. Accordingly, there have been major problems in the area of lens manufacturing time and lens performance.

SUMMARY OF THE INVENTION

The object of the present invention is to provide a non-spherical surface shape measuring device that makes it possible to correct the alignment error of the object surface with a high degree of precision when measuring the shapes of higher-order non-spherical surfaces.

Another object of the present invention is to provide a method that makes it possible to correct the alignment error of the object surface with a high degree of precision when measuring the shapes of higher-order non-spherical surfaces.

A further object of the present invention is to provide a method of manufacturing non-spherical optical members that makes it possible to correct the alignment error of the object surface with a high degree of precision when measuring the shapes of higher-order non-spherical surfaces.

A still further object of the present invention is to provide a manufacturing method that makes it possible to manufacture optical members with high-precision non-spherical surfaces in a short time.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the non-spherical surface shape measuring device includes a non-spherical surface shape measuring device that measures the shapes of object surfaces that have rotationally symmetrical non-spherical surface shapes on the basis of relative deviation values from the shape of a reference surface. Furthermore, the object is achieved by providing (a) a measuring device that obtains relative deviation values between the reference surface and an object surface, with a rotationally symmetrical non-spherical surface shape as measured data, corresponding to sampling points on the object surface; (b) a first operating means that approximates the values of partial differential coefficients by substituting the design values data of the variables Tx, Ty, Sx, Sy, and Sz describing the relative displacement between the object surface and the reference surface and the XY-coordinates of the sampling points into functional equations of the partial differential coefficients, which constitutes an approximated equation of the relative deviation values between the object surface and the reference surface derived by total differentiation of coordinate-transformed equations obtained by subjecting design equations, expressing the design shape of the non-spherical surface shape, to a coordinate transformation with respect to the variables Tx, Ty, Sx, Sy, and Sz; (c) a second operating means that calculates, as the relative displacement between the object surface and the reference surface, the optimal approximate values constituting very small increments of the variables that give the sums of the least squares of subtraction data obtained by subtracting the calculated data of the relative deviation values (obtained by substituting the approximate values of the partial differential coefficients calculated by the first operating means and the XY-coordinate values of the sampling points into the approximate functional equation) from the measured data; and (d) a third operating means that corrects the relative deviation values according to the relative displacement calculated by the second operating means.

The non-spherical surface shape measuring device of the present invention makes it possible to correct, with a high degree of precision, the relative deviation values between the shape of an object surface and the shape of a reference surface by accurately ascertaining the relative displacement between the object surface and reference surface. Accordingly, the shape of the object surface can be accurately measured regardless of the alignment of the object surface.

In another aspect the non-spherical surface shape measuring method for measuring shapes of object surfaces having rotationally symmetrical non-spherical surface shapes based on relative deviation values from a shape of a reference surface, includes the steps of measuring relative deviations between a reference surface and an object surface by measuring corresponding sampling points on the surfaces of the reference surface and the object surface and storing predetermined coefficients of variables prior to measurement, approximating partial differential coefficients for predetermined variables modeling a relative displacement between the object surface and the reference surface and XY-coordinates of the sampling points into functional equivalents of the partial differential coefficients, approximating the relative displacement between the object surface and the reference surface, and correcting the relative deviation values according to the relative displacement approximated.

Furthermore, the non-spherical surface shape measuring method includes the steps of: (a) performing a plurality of coordinate-transformations independently for each of the predetermined variables; and (b) approximating functional equivalents for the relative deviation values between the object surface and the reference surface by differentiating each of the predetermined variables, and then summing the results.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 3(a) that illustrates the design values which express the shape of the object surface; and FIG. 3(b) that illustrates the precision of the alignment error correction determined by simulation;

DETAILED DESCRIPTION OF THE PREFERRED EMBODIMENTS

Reference will now be made in detail to the preferred embodiments of the present invention, examples of which are illustrated in the accompanying drawings.

A preferred embodiment of the non-spherical surface shape measuring device of the present invention will be described with reference to FIGS. 1 through 4.

Figure 1:
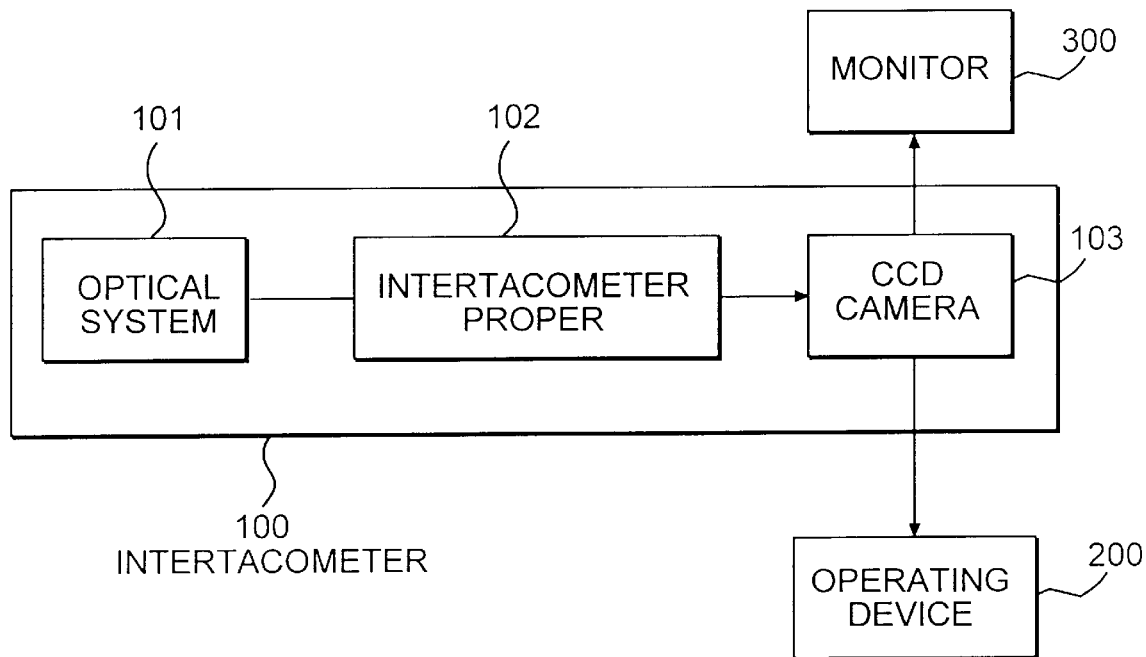
FIG. 1 is a block diagram that illustrates the calibration of the non-spherical surface shape measuring device of the present invention.

FIG. 1 illustrates the construction of one working embodiment of the non-spherical surface shape measuring device of the present invention. In FIG. 1, 100 indicates an interferometer, 200 indicates an operating device, and 300 indicates a monitor. The interferometer 100 is equipped with an optical system 101, an interferometer proper 102, and an interference fringe imaging device 103 (CCD camera) that images the interference fringes. The operating device 200 and monitor 300 (used for alignment) are respectively connected to the interference fringe imaging device 103.

Figure 2:
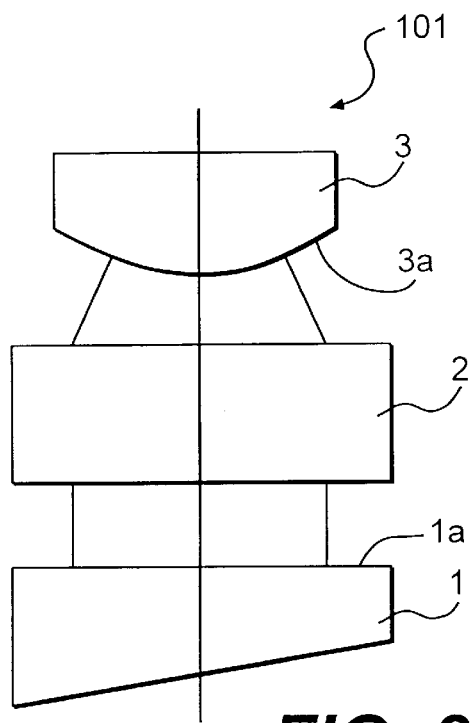
FIG. 2 is a diagram illustrating the optical system used for interference measurements.

As is shown in FIG. 2, the optical system 101 is equipped with a Fizeau flat lens 1, on which the flat wave, from the interferometer 100, is caused to be incident. A null element 2 (null lens) converts the light beam that passes through the Fizeau flat lens 1 into a null wave front. Object lens 3 reflects the light that passes through the null element 2; an object surface 3a, with a non-spherical surface shape, which constitutes the shape of the object to be measured, is formed on the object lens 3. The flat wave, which is emitted by the interferometer proper 102, is split into reflected light and transmitted light at the high-precision flat surface 1a of the Fizeau flat lens 1. The reflected light returns to the interferometer proper 102, while the transmitted light passes through the null element 2 and is converted into a null wave front. This null wave front is reflected by the object surface 3a of the object lens 3 and again returns to the interferometer proper 102.

The interferometer proper 102 includes a light source, which emits interferable light, a beam expander and a beam splitter, among other devices, and causes the interference fringes, formed by the interference between the light reflected by the high-precision flat surface 1a and the light reflected by the object surface 3a to be focused on the imaging plane of the interference fringe imaging device 103. The interference fringe imaging device 103 images the interference fringes thus produced and sends the image information thus obtained to the operating device 200 and the monitor 300.

The operating device 200 performs (a) the function of storing information concerning the object surface 3a beforehand and calculating and storing the coefficients required for subsequent operations prior to measurement; (b) the function of converting the image information from the interference fringe imaging device 103 into light path difference data; (c) the function of analyzing such light path difference data on the basis of the stored coefficients and calculating the shape error of the object surface 3a; and (d) the function of displaying the measurement results.

The monitor 300 displays the interference fringes themselves and is used to align the object surface 3a. Furthermore, since a method for converting the image information from the interference fringe imaging device 103 into light path difference data with a high degree of precision is universally known, the details of this method will not be described in the present specification.

The alignment error correction and null wave front calibration, performed where a non-spherical surface is measured using the non-spherical surface shape measuring device constructed as described above, will now be described.

Alignment Error Correction

In the present invention, alignment error correction is used in order to guarantee the calculation of surface precision data with good reproducibility regardless of the alignment of the object lens 3 where the higher-order non-spherical surface, object surface 3a, of one object lens 3, is measured by interference with respect to a null wave front. Furthermore, as will be described later, where the shape of the null wave front, used as a reference for the surface precision data, is removed from the original design value, this shape must be confirmed by separate measurement.

It is necessary to note that this alignment error correction itself is not something that takes a correlation of the higher-order non-spherical surfaces of different object lenses. The reason for this is that, for example, even if there are two object lenses for which interference fringes of one color are obtained, the shapes will differ from each other if the positions in the direction of the optical-axis at which the respective interference measurement data are obtained, are different, so that the respective coefficients in Equation (1) will be different. This phenomenon does not occur in the ordinary measurement of spherical surfaces or the folded back measurement of conical surfaces, but rather occurs only in the null measurement of higher-order non-spherical surfaces. Specifically, in the case of spherical surfaces, only a power correction is performed in order to obtain surface precision data (sphericity). The curvature radius can be determined by separate curvature radius measurements. Even in folded back measurements of conical surfaces, κ correction and R correction alone are sufficient to obtain surface precision true degree of asphericity data and κ and R, in this case, can be determined by separate κ and R measurements. In the case of null interference measurements of higher-order non-spherical surfaces, on the other hand, it is necessary to make slight changes in the handling of aberrations generated by discrepancies in alignment in the direction of the optical-axis.

A detailed description of the method of alignment correction, in the measurement of higher-order non-spherical surfaces, will now be described. In regard to the null wave front used in measurement in the following description, it is assumed that an ideal wave front is formed in a stipulated position by a so-called null element 2, which is represented by diffraction grating-type elements, such as zone plates or null lenses made up of numerous lenses. Furthermore, when an ideal wave front is not formed, according to the design values, calibration of the null wave front actually formed is necessary. The calibration of the wave front, in such cases, will be described later.

The interference measurement data consists of deviation data, obtained as a result of the detection of the phase differences, equivalent to the light path differences in the normal direction between the object surface 3a and the reference wave front at grid points on the object surface 3a, by means of the interference fringe imaging means 103 of the interferometer 100, which has a sampling interval with an equal pitch in the X-direction and Y-direction. The reference wave front constitutes a surface shape, which is equivalent to the object surface 3a, the reference wave front has an ideal shape which is such that the deviation across the entire range of measurement is zero if the object surface 3a has a shape that is in accordance with the design values.

Because of optical distortion of the optical system and distortion in the pixel arrangement of the CCD, the XY-coordinates, and grid points of the respective sampling points on the object surface 3a corresponding to the respective pixels of the CCD, are ordinarily distorted into a state of unequal pitch. The following detailed description will describe the case in which data obtained by interpolating measured data to XY-equal-pitch data is analyzed. However, this interpolation is not essential for analysis. Alignment error correction is possible as long as there is an accurate understanding of the distortion of the respective grid points, i.e., of the XY-coordinates of the respective grid points. Where the grid points do not have an equal pitch, however, it is necessary to apply weighting to the grid points, in accordance with the arrangement of the grid points, in applying, for example, the method of least squares.

Furthermore, in the following description, it is assumed that the direction of the error, shown by the deviation data obtained by the interferometer, is the normal direction of the object surface, reference wave front, and that the correspondence between data calculated by simulation and actually measured data is handled by applying a coordinate transformation to the actually measured data. Specifically, the interference measurement data obtained is converted into deviation data in the direction of the non-spherical surface axis (Z-axis) (i.e., difference data between the null wave front shape and the object surface shape in the direction of the Z-axis), so that the coordinate system agrees with data for the reference wave front and reference surface, prepared as data in the direction of the non-spherical surface axis (Z-axis).

Instead of using this method, it is also possible to treat the data in the normal direction "as is" without applying a transformation operation to the actually measured data and to handle this problem by preparing the data calculated by simulation, i.e., the alignment error correction equations, so that this data corresponds to the normal direction of the object surface $3a$. The present invention can be similarly applied in such a case as well. Moreover, since data is generally obtained as coordinates in an orthogonal coordinate system in the coordinate measuring device, it is advisable to arrange the system so that calculations that use the direction of the non-spherical surface axis (Z-axis) as a reference can be performed "as is."

The derivation of the alignment error correction equations will now be described. First, it is assumed that the two alignment deviations X-tilt (Tx) and Y-tilt (Ty) are applied to the higher-order non-spherical surface shape expressed by Equation (1). In this case, the simultaneous equations are shown in Equations (2) through (4) as follows:

$$XX = X \cos Tx + Z \sin Tx \quad (2)$$

$$YY = Y \quad (3)$$

$$ZZ = -X \sin Tx + Z \cos Tx \quad (4)$$

Here, Equation (4) can be transformed, using Equation (2), as follows:

$$ZZ = -X/\sin Tx + XX/\tan Tx \quad (5)$$

Substituting Equation (1) into Z of Equation (2), and then substituting Equation (3) and solving for X, we obtain the following expression:

$$X = f[XX, YY] \quad (6)$$

In the case of a conic shape, where $Ci=0$, X can be solved algebraically as a function of XX, as shown in Equation (6). However, in the case of higher-order non-spherical surfaces in which Ci does not equal 0, the order of the equation is fifth order or greater, so that an algebraic solution is impossible. Accordingly, numerical operations must be used. An example of such numerical operations will be described below.

First, in order to include Tx in the variables of the function expressed by Equation (6), a polynomial equation for Tx is prepared, as shown in Equation (7), as follows:

$$X - XX \equiv A[Tx, XX, YY] \quad (7)$$
$$\equiv A1[XX, YY]Tx + A2[XX, YY]Tx^2 + \ldots$$

The coefficients $Ai[XX, YY]$ in Equation (7) are functions of $(XX, YY)$. In the present invention, the following Zernike polynomial, of Equation (8) is used:

$$Ai[XX, YY] = A_{01}i + A_{02}i \cdot XX + A_{03}i \cdot YY + \quad (8)$$
$$A_{04}i \cdot (2 \cdot XX^2 + 2 \cdot YY^2 - 1) + A_{05}i \cdot (XX^2 + YY^2) +$$
$$A_{06}i \cdot (2 \cdot XX \cdot YY) + A_{07}i \cdot \{3 \cdot (XX^2 + YY^2) - 2\} \cdot XX +$$
$$A_{08}i \cdot \{3 \cdot (XX^2 + YY^2) - 2\} \cdot YY +$$
$$A_{09}i \cdot \{6 \cdot (XX^2 + YY^2)^2 - 6 \cdot (XX^2 + YY^2) + 1\} +$$
$$A_{10}i \cdot \{4 \cdot XX^3 - 3 \cdot (XX^2 + YY^2) \cdot XX\} +$$

-continued
$$A_{11}i \cdot \{-4 \cdot YY^3 + 3 \cdot (XX^2 + YY^2) \cdot YY\} +$$
$$A_{12}i \cdot \{4 \cdot (XX^2 + YY^2) - 3\} \cdot (XX^2 + YY^2) +$$
$$A_{13}i \cdot \{4 \cdot (XX^2 + YY^2) - 3\} \cdot (2 \cdot XX \cdot YY) +$$
$$A_{14}i \cdot \{10 \cdot (XX^2 + YY^2)^2 - 12 \cdot (XX^2 + YY^2) + 3\} \cdot XX +$$
$$A_{15}i \cdot \{10 \cdot (XX^2 + YY^2)^2 - 12 \cdot (XX^2 + YY^2) + 3\} \cdot YY +$$
$$A_{16}i \cdot \{20 \cdot (XX^2 + YY^2)^3 - 30 \cdot (XX^2 + YY^2)^2 + 12 \cdot (XX^2 + YY^2) - 1\}$$

The detailed development of the calculations are omitted here; however, respective coefficients "$A_{jj}i$" are optimally fit beforehand (by the method of least squares) to the numerical data "Ai [XX, YY]" for an appropriate range of "Tx", corresponding to the actual measurements, and the results are stored in the operating device. Furthermore, in regard to the design values of the coefficients in Equation (1) used in simulation, it has been confirmed that approximation to $i=4$ is sufficient in terms of precision. Moreover, the form of the function is not limited to a Zernike polynomial equation.

The method used where the alignment error correction equations are derived for a shape in which the residual differences that occur when optimal fitting is applied to the above numerical data (using coefficients with a small order number) are sufficiently small will now be described. Where sufficient optimal fitting is possible, using the coefficients $A_{jj}i(jj=01$ to $09)$, the equation modified by substituting these coefficients into Equation (7) is as follows:

$$X = XX + A[Tx, XX, YY] \quad (9)$$

This result can be substituted into Equation (5), thus producing Equation (10) as follows:

$$ZZ = F[Tx, XX, YY] \quad (10)$$

This can be expressed as a fourth-order polynomial equation for YY.

When the Y-tilt (Ty) is applied to Equation (10), the simultaneous equations expressed by Equations (11) through (13) are obtained as follows:

$$XXX = XX \quad (11)$$

$$YYY = YY \cos Ty + ZZ \sin Ty \quad (12)$$

$$ZZZ = -YY \sin Ty + ZZ \cos Ty \quad (13)$$

Similarly, by substituting Equation (11) into Equation (13), Equation (14) is derived as follows:

$$ZZZ = -YY/\sin Ty + YYY/\tan Ty \quad (14)$$

Substituting Equation (10) into ZZ of Equation (12), and then further substituting Equation (11) and solving the fourth-order equation for YY, we obtain Equation (15) as follows:

$$YY = g[Tx, Ty, XXX, YYY] \quad (15)$$

By substituting this YY into Equation (14), it is possible to derive Equation (16) as follows:

$$ZZZ = G[Tx, Ty, XXX, YYY] \quad (16)$$

Verification of the correlation of the (X, Y) coordinates calculated by the above method, i.e., verification of the error and residual difference from the actual coordinates was performed for the design shape of a conical surface.

Specifically, by using the coefficients $A_{jj}i(jj=01$ to 09) as the coefficients $Ai[XX, YY]$ in Equation (7), in the case of a parabolic surface using a κ value extremely close to zero, it was possible to perform optimal fitting to a degree that makes it possible to ignore residual differences.

On the other hand, for non-spherical surface shapes in which the residual differences of optimal fitting using coefficients with such small order numbers cannot be ignored, it becomes necessary to use at least the coefficients $A_{01}i$ through $A_{16}i$, so that Equation (10) becomes a sixth-order or higher polynomial equation with respect to XX, YY. Accordingly, a transformation such as that shown by Equation (15) becomes algebraically impossible.

Therefore, Equation (10), in which ZZ is expressed as a function of the X-tilt (Tx) using the coefficients $A_{jj}i$ which have already been determined, is used to calculate the following coefficients for the X-tilt (Tx) and Y-tilt (Ty) beforehand by the method of least squares, and the results are stored in the operating device. Specifically, the following polynomial equation for Ty is prepared:

$$YY - YYY \equiv B1[Tx, XXX, YYY]Ty + B2[Tx, XXX, YYY]Ty^2 + \ldots \quad (17)$$

Then, optimal fitting is applied by means of the Zernike polynomial equation, as shown in Equation (18), which has the same order number as Equation (8), as follows:

$$\begin{aligned}Bi[Tx, XXX, YYY,] = &\ B_{01}i[Tx] + B_{02}i[Tx] \cdot XX + B_{03}i[Tx] \cdot YY + \\ &B_{04}i[Tx] \cdot (2 \cdot XX^2 + 2 \cdot YY^2 - 1) + B_{05}i[Tx] \cdot (XX^2 + YY^2) + \\ &B_{06}i[Tx] \cdot (2 \cdot XX \cdot YY) + B_{07}i[Tx] \cdot \{3 \cdot (XX^2 + YY^2) - 2\} \cdot XX + \\ &B_{08}i[Tx] \cdot \{3 \cdot (XX^2 + YY^2) - 2\} \cdot YY + \\ &B_{09}i[Tx] \cdot \{6 \cdot (XX^2 + YY^2)^2 - 6 \cdot (XX^2 + YY^2) + 1\} + \\ &B_{10}i[Tx] \cdot \{4 \cdot XX^3 - 3 \cdot (XX^2 + YY^2) \cdot XX\} + \\ &B_{11}i[Tx] \cdot \{-4 \cdot YY^3 + 3 \cdot (XX^2 + YY^2) \cdot YY\} + \\ &B_{12}i[Tx] \cdot \{4 \cdot (XX^2 + YY^2) - 3\} \cdot (XX^2 - YY^2) + \\ &B_{13}i[Tx] \cdot \{4 \cdot (XX^2 + YY^2) - 3\} \cdot (2 \cdot XX \cdot YY) + \\ &B_{14}i[Tx] \cdot \{10 \cdot (XX^2 + YY^2)^2 - 12 \cdot (XX^2 + YY^2) + 3\} \cdot XX + \\ &B_{15}i[Tx] \cdot \{10 \cdot (XX^2 + YY^2)^2 - 12 \cdot (XX^2 + YY^2) + 3\} \cdot YY + \\ &B_{16}i[Tx] \cdot \{20 \cdot (XX^2 + YY^2)^3 - \\ &\qquad 30 \cdot (XX^2 + YY^2)^2 + 12 \cdot (XX^2 + YY^2) - 1\}\end{aligned} \quad (18)$$

In this way, the respective coefficients $Bi[Tx, XXX, YYY]$ are calculated. These respective coefficients constitute polynomial equations for Tx that can be expressed in Equation (19) as follows:

$$B_{jj}i[Tx] \equiv C0_{jj}i + C1_{jj}i \cdot Tx + C02_{jj}i \cdot Tx^2 + \ldots \quad (19)$$

For the design values of Equation (1) used in the simulation, approximation to C4 proved to be sufficient in terms of precision. In regard to these approximate polynomial equations, $B_{jj}i[0]$ may assume values other than zero even when Tx=0. Therefore, optimal fitting is performed including the DC components of $C0_{jj}i$ as well. The functional form of Equation (16) can be obtained by substituting into Equation (14) Equation (20) as follows:

$$YY = YYY + B1[Tx, XXX, YYY] \cdot Ty + B2[Tx, XXX, YYY] \cdot Ty^2 + \ldots \quad (20)$$

which is equivalent to Equation (18).

The derivation of the functional form including the tilt alignment discrepancies is completed by the above procedure. In Japanese Patent Application No. 7-32579, however, a method is described in which optimal fitting is performed with the total integration of the following equation, in which alignment discrepancies for shift, κ and R are simultaneously added to the Equation (16), being considered as equivalent to the actually measured data in the case of very small alignment discrepancies as indicated by Equation (21) as follows:

$$ZZZ = G[Tx, Ty, \kappa + \Delta\kappa, R + \Delta R, XXZ\text{-axis } Sx, YYY - Sy] \quad (21)$$

However, when an attempt is made to apply this method to higher-order non-spherical surfaces, the variables of κ and R vanish at the point of Equation (9). Therefore, this method is essentially unusable. Furthermore, even if the addition of alignment discrepancies is performed independently with respect to Equation (1), there is no problem in terms of precision, as long as the respective alignment discrepancies do not give rise to any error caused by the setting of the initial values (tentative values) of the alignment discrepancies at the time that the partial differential coefficients (described later) are calculated. In order to verify this point, the appropriateness of this independent calculation method was confirmed by a simulation wherein the object surface 3a was a conical surface.

Even in cases where error is generated, this can be handled by feedback operations as long as the error is within a range in which there is no occurrence of chaotic phenomena divergence. Accordingly, in regard to the operations performed on higher-order non-spherical surfaces, it was decided to calculate the respective partial differential coefficients by performing the addition of alignment discrepancies independently with respect to Equation (1). In the non-spherical surface shape measuring device of the present invention, as will be described later, the total differentiation of the shape is constructed by relational equations of the respective partial differential coefficients. The total differentiation is determined on the basis of the calculation of the respective partial differential coefficients.

First, in regard to tilt, "G" in Equation (16) is rewritten as "GT", and partial differentiation is performed for the respective variables Tx and Ty, thus defining Equation (22) and Equation (23) as follows:

$$PDTx[X, Y] = \partial GT[Tx, Ty, XXX, YYY]/\partial Tx \quad (22)$$

$$PDTy[X, Y] = \partial GT[Tx, Ty, XXX, YYY]/\partial Ty \quad (23)$$

With respect to shift, the two alignment discrepancies of X-shift (Sx) and Y-shift (Sy) are applied to the basic equation of Equation (1), and partial differentiation is performed for the respective variables Sx and Sy with respect to the Equation (24) as follows:

$$\begin{aligned}GS[Sx, Sy, XXX, YYY] \equiv &\\ Z[\kappa, R, C_{02}, C_{04}, &C_{06}, C_{08}, C_{10}, X - Sx, Y - Sy]\end{aligned} \quad (24)$$

thus resulting in Equation (25) and Equation (26) as follows:

$$PDSx[X, Y] = \partial GS[Sx, Sy, XXX, YYY]/\partial Sx \quad (25)$$

$$PDSy[X, Y] \equiv \partial GS[Sx, Sy, XXX, YYY]/\partial Sy \quad (26)$$

Thus, the derivation of the relational equations of the partial differential coefficients for the variables describe the relative positions in the two directions of tilt, and shift is completed. For these four variables, Tx, Ty, Sx, and Sy, the relational equations of the partial differential coefficients can also be derived using the following equation, in which shift is directly applied to Equation (16) resulting in Equation (27) as follows:

$$ZZZ = G[Tx, Ty, XXX-Sx, YYY-Sy] \quad (27)$$

In this case the calculations become complicated. However, Equation (27) was utilized directly in the preparation of data used in a simulation that was performed in order to verify the method of the present invention.

Additionally, the alignment discrepancy of the Z-shift (Sz) was introduced as a variable expressing the discrepancy of the object surface $3a$ in the direction of the optical-axis instead of κ and R in the folded back measurement of a conical surface, and the following manipulation of Equation (1) was performed.

In order to definitively determine the position of this Z-shift, it is necessary to calibrate beforehand the identity (shape) of the null wave front used in measurement. First, the derivation of the alignment correction equations will be described with the assumption that the null wave front is formed in the prescribed position in accordance with the design values.

In order to allow the application of a linear method of least squares, least-square fitting using the following equation is applied to Equation (1) itself, so that Equation (1) is approximated by the polynomial equation of Equation (28) as follows:

$$g[r] = S0 + S1 \cdot r^2 + \ldots + S8 \cdot r^{16} \quad (28)$$
$$\equiv \sum Si \cdot r2i$$

($i$ = a natural number from 0 to 8)

Here, $r \equiv (X^2 + Y^2)^{1/2}$

Furthermore, since (κ, R) and (C02, C04) are roughly equivalent, there may be cases in which the respective coefficients of κ, R, C02 and C04 are not stably constrained if fitting is applied with Equation (1) "as is" in the calibration of the null wave front (described later). Accordingly, this operation is an extremely useful transformation. Specifically, by introducing Equation (28) in place of Equation (1), it is possible to perform stable fitting. However, in cases where calibration of the null wave front is not being considered (i.e., in cases where such calibration is unnecessary), there is no objection to performing the following operations on κ, R and Cii of Equation (1), without using Equation (28). Furthermore, depending on the shape of the non-spherical surface, the approximation error may also be reduced by increasing the order number.

Meanwhile, because of the linear propagation characteristics of the light beam, the design null wave front, formed in a prescribed position, undergoes the following change when displacement by a fixed distance of ΔP in the direction of the Z axis occurs as represented by Equation (29) as follows:

$$\Delta Z[r] = \Delta P \cdot \{(1/\cos\theta[r]) - 1\} \quad (29)$$

Here, θ[r] expresses the angle formed by the normal of the null wave front in the (X, Y) coordinate values of the radius r with respect to the Z axis. Thus Equation (30) can be derived as follows:

$$\theta[r] = \tan^{-1}[g'[r]] \quad (30)$$

Here, the "'" in Equation (30) signifies a differentiation operation with respect to r substituting Equation (30) into Equation (29) yields Equation (31) as follows:

$$\Delta Z[r] = \Delta P \cdot \{(1/\cos[\tan^{-1}[g'[r]]]) - 1\} \quad (31)$$

expressing the amount of change in the null wave front in approximate terms.

In this case, there is actually a shift in the horizontal coordinates in addition to the change ΔZ. However, as long as ΔP is within a range that allows the interference fringes to be analyzed, i.e., as long as ΔP is extremely small, it may be predicted that this shift in the horizontal coordinates will be small enough to be ignored. Furthermore, as was confirmed by comparative subtraction, with the direct substitution of Equation (1) for g[r] in Equation (31), the approximation error of ΔZ[r] can be ignored. However, an attempt was made to eliminate approximation error by using Equation (1) to prepare data equivalent to actually measured data for use in simulation.

It is apparent from Equation (31) that the amount of change in the wave front that occurs when the null wave front advances directly in the direction of the optical axis is directly proportional to ΔP. Accordingly, ΔP is set equal to 1, and the amount of change is normalized by the method of least squares.

Equation (32) is as follows:

$$dg[r] = \Sigma(\partial g[r]/\partial Si) \cdot dSi \quad (32)$$

Specifically, based on the assumption that the total differentiation of Equation (32) is equal to ΔZ, it is sufficient to solve the simultaneous equation $$\partial H/dSi = 0$$

which is obtained for Equation (33), wherein:

$$H = \Sigma\{\Delta Z[r] - \Sigma(\partial g[r]/\partial Si) \cdot dSi\}^2 \quad (33)$$

Replacing the dSi thus obtained as "dSSi", then Equation (32) is represented as follows:

$$PDSz[X, Y] \equiv \Sigma(\partial g[X, Y]/\partial Si) \cdot dSSi \quad (34)$$

The functional Equation (34) expresses the partial differential coefficient for the variable Sz. Furthermore, the "·dSSi" in Equation (34) is added as a result of normalization.

Equations (22), (23), (25), (26), and (34) obtained as a result of the above operations give the coefficients obtained by partial differentiation of equations equivalent to Equation (1) for the variables describing the respective alignment discrepancies. Total differentiation may be expressed (for Equation 35) as follows, using these partial differential coefficients.

$$PD[dTx, dTy, dSx, dSz; X, Y] \equiv \quad (35)$$
$$PDTx[X, Y] \cdot dTx + PDTy[X, Y] \cdot dTy +$$
$$PDSx[X, Y] \cdot dSx + PDSy[X, Y] \cdot dSy + PDSz[X, Y] \cdot dSz$$

Equation (35) is an approximate function that approximates the relative deviation values generated between the null wave front and the object surface 3a expressed by Equation (1) in cases where respective alignment discrepancies of the very small increments dTx, dTy, dSx, dSy and dSz are simultaneously received. Accordingly, it is sufficient to determine the conditions for which Equation (36) is minimized.

$$\text{Sum} = \Sigma \{Wf[X, Y] - PD[dTx, dTy, dSx, dSy, dSz; X, Y]\}^2 \quad (36)$$

Where Wf[X, Y] is obtained by transforming the measured data actually obtained by the interferometer into XY-equal-pitch data in the direction of the Z-axis by interpolation. That is, by solving the following simultaneous equations, it is possible to calculate the optimal fitting values of the respective alignment discrepancies by the method of least squares, as depicted in Equation (37A)–(37E), as follows:

$$\partial \text{Sum}/\partial dTx = 0 \quad 37(A)$$

$$\partial \text{Sum}/\partial dTy = 0 \quad 37(B)$$

$$\partial \text{Sum}/\partial dSx = 0 \quad 37(C)$$

$$\partial \text{Sum}/\partial dSy = 0 \quad 37(D)$$

$$\partial \text{Sum}/\partial dSz = 0 \quad 37(E)$$

Data for the relative deviation values Wt[X, Y] of the shape error of the object surface 3a with respect to the null wave front shape described by the known coefficients Si can be obtained by substituting the optimal values dTx, dTy, dSx, dSy, and dSz obtained, as described above, into the following equation:

$$Wt[X, Y] = Wf[X, Y] - PD[dTx, dTy, dSx, dSy, dSz; X, Y] \quad (38)$$

That is, by applying correction using the optimal values dTx, dTy, dSx, dSy, and dSz as alignment correction values, it is possible to obtain shape data for the object surface 3a in a state in which alignment error has been eliminated. The above operations are performed in the operating device 200.

The conversion of measured data into XY-equal-pitch data by interpolation is not always necessary. For example, it would also be possible to apply so-called "interpolation-less fitting" in which least-square fitting is performed using XY-coordinate values which have been subjected to horizontal coordinate distortion. Moreover, in the case of rotationally symmetrical horizontal coordinate distortion, ordinary fitting can also be accomplished by correcting the coefficients of Equation (1) itself.

FIG. 3 shows the results of a simulation of the precision of the alignment error correction. FIG. 3(a) shows the design values of the non-spherical surface, and FIG. 3(b) shows the results of the alignment error correction of the piston component, Z-shift component, X-tilt component, Y-tilt component, X-shift component and Y-shift component. In regard to the respective components, as shown in FIG. 3(b), the upper rank for each component indicates the calculated results, the middle rank indicates the amounts of deviation set by simulation, and the lower rank indicates the difference between the calculated results and the set amounts of deviation, i.e., the error. As is clear from FIG. 3(b), a highly precise alignment error correction can be accomplished using the non-spherical surface shape measuring device of the present invention.

In the above description, it was described where an alignment error correction was performed for the object surface shape data obtained by interference measurements. However, the present invention can also be used where, for example an alignment error correction is applied to difference data representing the difference between data for a prescribed reference shape and data for an object surface 3a, based on an orthogonal coordinate system obtained by means of a coordinate measuring device. The non-spherical surface shape measuring device of the present invention is not limited to interference measurements based on light path differences, but can be used in all cases where shape data for an object surface 3a is calculated in comparison with reference data.

Calibration of Null Wave Front

In the above description, discussion was directed toward an assumption, in which the coefficients κ, R, and Cii expressing the shape of the actual null wave front used in measurement, were known in the derivation of Equation (34), and coefficients Si that were equivalent to the coefficients κ, R, and, Cii were used. However, where it cannot be expected that a null wave front, which is in accordance with the design values will be formed in a prescribed position, it is necessary to calibrate the null wave front.

The null wave front calibration procedure will now be described. In order to guarantee the precision of actual measurements, the appropriateness of the procedure is confirmed by means of a simulation. As postscript symbols used in the simulation, "1" (one)is appended to design values, and "d" is appended to actual values.

In this case, the design non-spherical surface shape can be expressed by the following equation obtained by rewriting Equation (28) as follows:

$$g1[r] = \Sigma Si1 \cdot (X^2 + Y^2)^i \quad (40)$$

Similarly, it is assumed that the actual null wave front can be expressed as follows:

$$gd[r] = \Sigma Sid \cdot (X^2 + Y^2)^i \quad (41)$$

Figure 4:
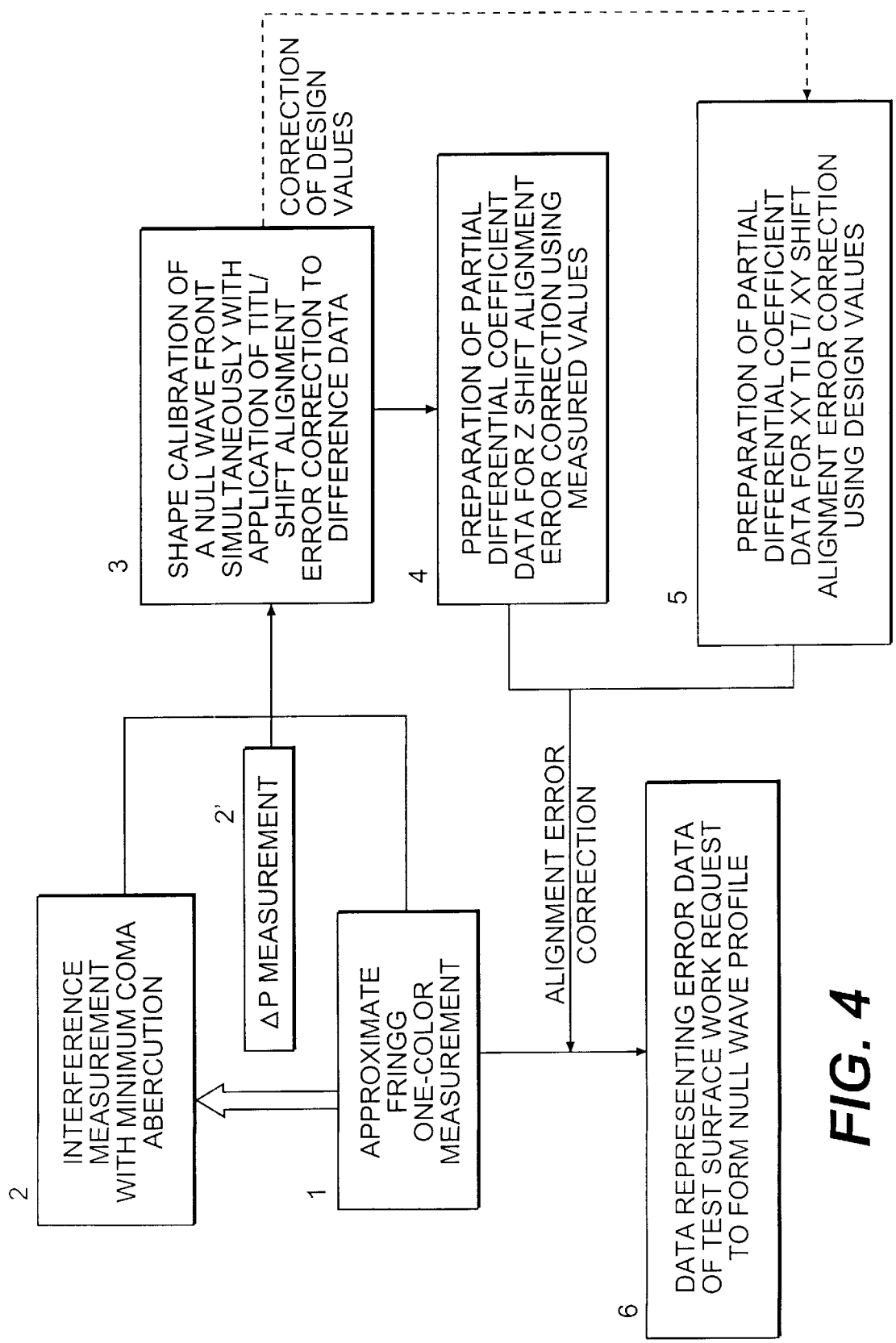
FIG. 4 is a diagram that illustrates the null wave front calibration procedure, and the alignment error correction procedure based on the calibrated null wave front data.

As is shown in FIG. 4, the null wave front calibration procedure proceeds as follows. First, the object surface 3a is aligned with the null wave front in a roughly "fringe one-color" state, and first interference measurement data D1j is obtained (FIG. 4(1)). Next, the object surface 3a is shifted in the direction of the optical axis by a known amount ΔP, with an effort being made to minimize coma-like aberration, i.e., with a sufficient tilt and shift alignment, and second interference measurement data D2j is obtained (FIG. 4(2)). Furthermore, the value of ΔP used in this case is measured (FIG. 4(2)').

Both of these sets of difference data express the amount of change in the actual null wave front captured at different positions in the direction of the optical axis, so that the following Equation (40) is established:

$$D2d - D1d \equiv \Delta Dd[Sid; X, Y] \quad (42)$$
$$= \Delta P \cdot \{(1/\cos[\tan^{-1}[gd'[r]]]) - 1\}$$

Here, $r = (X^2 + Y^2)^{1/2}$

Similarly, the following equation can be defined for the design values yielding Equation (43) as follows:

$$D21 - D11 \equiv \Delta D1[Si1; X, Y] = \Delta P \cdot \{(1/\cos[\tan^{-1}[g1'[r]]]) - 1\} \quad (43)$$

Postscript symbols should be added to "ΔP" as well; however, in order to simplify the description it is assumed that the following holds true:

$$\Delta pd = \Delta P1 = \Delta P$$

In actuality, error attributable to setting error of the ΔP is mixed with the calibration error of the null wave front as described below. However, the relationship here is such that if the shape of the null wave front undergoes a slight change, the amount of change ΔDd of the null wave front shows a large change. Considering this relationship in reverse, this means that even if the amount of change ΔDd of the null wave front varies considerably, the change in the specified null wave front shape is slight. Accordingly, in the calibration of the null wave front, the null wave front shape error arising from the error in ΔP is small, so that the error pertaining to ΔP does not greatly lower the precision of the null calibration. However, as described above, the error in ΔP creates an error component that is proportional to this ΔP error with respect to the amount of correction of the Z-shift, as is clear from the fact that the amount of correction used when a Z-shift alignment error correction is applied is determined on the basis of the property whereby the shape of the null wave front varies linearly with respect to ΔP. Furthermore, this means that calibration of the null wave front is a prerequisite for performing an alignment error correction in the direction of the aforementioned Z-shift.

Another type of error involved is the alignment error arising from tilt and shift alignment discrepancies that is mixed with the two sets of interference measurement data. Accordingly, where Equation (40) is based on measured data, it is necessary to eliminate such error by applying a comprehensive alignment error correction for the aforementioned tilt and shift to the difference data. Furthermore, in regard to the method of application used in the case of such a comprehensive application to this difference data, the null wave front calibration may be performed after an alignment error correction has been applied for the XY-tilt and XY-shift, or these may be performed simultaneously, i.e., an alignment error correction may be performed for the difference data as shown, for example, in FIG. 4 block (3).

A procedure for treating difference data, which does not contain the above described alignment error, will now be described.

The differences between the two sets of difference data expressed by Equation (42) and Equation (43) may be viewed as amounts of change generated by applying very small increments ΔSi to the approximate design values of Equation (43), this relationship can be expressed, in Equation 44 as follows:

$$\Delta Dd[Sid; X, Y] - \Delta D1[Si1; X, Y] = \sum (\partial \Delta D1[Si1; X, Y]/\partial Si1) \cdot \Delta Si \quad (44)$$

Accordingly, by performing optimal fitting using Equation (44) for calculated data equivalent to measured data, the optimal approximate values of ΔSi can be obtained. Using these values, the approximate values Si1* of Sid can be defined by Equation (45) as follows:

$$Si1^* = Si1 + \Delta Si \quad (45)$$

These values can be substituted for Si1. Accordingly, by repeating similar calculations using these Si1* values instead of the design values Si1, the Si1* values can be caused to converge with Sid.

By performing a similar optimal approximation using the same equations as Equations (33) and (34) for the Sid values thus obtained, it is possible to determine normalized coefficients dSSSi for the actual null wave front. Accordingly, the partial differential coefficients in Equation (34) can also be calculated.

Furthermore, there is also ΔP setting error, and in cases where ΔPd does not equal ΔP1, the Z shift in the direction of the optical-axis, indicated by the difference data as expressed by these dSSSi coefficients, merely reproduces the set values, as indicated by Equation (46) as follows:

$$\Delta P1 \approx \left(\sum \partial gd[X, Y]/\partial Sid \cdot dSSSi \cdot \Delta Dd[Sid; X, Y]\right)/ \left(\sum \partial gd[X, Y]/\partial Sid \cdot dSSSi\right)^2 \quad (46)$$

This results in an offset when these coefficients are used.

The partial differential coefficients used for the tilt and shift alignment error correction can also be recalculated using the null wave front shape Sid obtained following calibration of the null wave front. Strictly speaking, it is necessary to repeat the calibration of the null wave front and re-calculate Sid using these values, and then to repeat this operation until the Sid* values obtained converge.

In order to insure the precision required for measurement of the Z-shift ΔP, in the direction of the optical axis in the calibration of the null wave front described above, it is also possible to use an accurately calibrated piezo-electric element, or to use a length-measuring means such as a separately prepared laser length-measuring device, or similar device.

As is shown in FIG. 4 blocks (4) through (6), the shape of the object surface 3a can be calculated as differences relative to the shape of the null wave front by performing the alignment error correction ((4) and (5)) on the basis of the null wave front calibration. Furthermore, the operations required for the calibration of the null wave front and the operations of the alignment error correction based on the calibrated null wave front are performed in the operating device 200.

Figure 5:
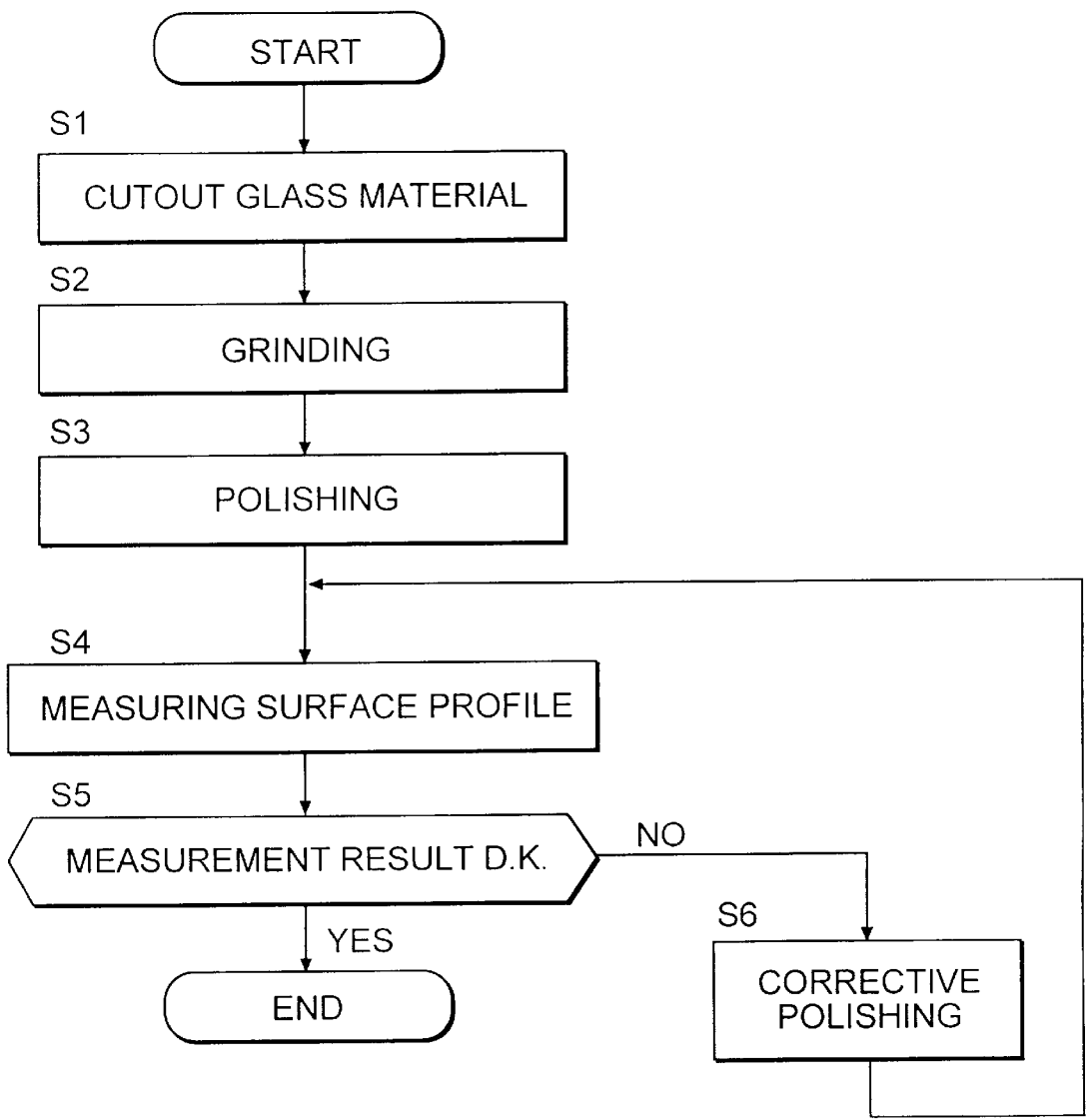
FIG. 5 is a flow chart illustrating the process steps for manufacturing optical members with non-spherical surface shapes of an embodiment of the present invention.

An embodiment of the method of the present invention for manufacturing optical members with non-spherical surfaces will now be described with reference to FIG. 5. The cutting of the glass element is performed in step S1 as shown in FIG. 5. A highly uniform glass element, which meets the required specifications, is cut to a size and shape suited to the subsequent grinding process, thus forming a workpiece. The workpiece is ground to a spherical surface using a spherical surface grinder, which creates a spherical surface by rotating a cup-shaped diamond grinding wheel, or is ground to a flat surface using a plane grinder, which employs a flat-plate-form diamond grinding wheel. The glass surface at this stage of the process still does not have the prescribed shape. Accordingly, the cut-out workpiece is ground to a shape that is close to the target shape in step S2.

In the grinding process of step S2, an NC grinding operation is performed, thus producing a surface which has substantially the prescribed surface shape. A high-rigidity NC grinder, which is installed on a sliding table guided by hydrostatic bearings and which is equipped with a grinding wheel shaft and a main shaft that can be rotated at a high speed (also using hydrostatic bearings), is generally used in step S2. Preferably, the precision surface formed by pre-grinding the workpiece is attached to the main shaft of the grinder and the grinding wheel shaft of an appropriately tooled and dressed diamond grinding wheel in which a super-abrasive grain layer formed by diamond abrasive grains and a binder is bonded to an aluminum alloy base. Both shafts are caused to rotate at a high speed and a pressing contact is effectuated with a grinding liquid being interposed. The grinding wheel shaft is caused to move in accordance with NC control (positional control using a laser wavelength system) along a pre-calculated track, thus producing a prescribed shape. In the most preferred embodiment, an on-machine shape measurement of the workpiece is performed, and grinding is repeated with deviations from the prescribed shape fed back to the track of the grinding wheel shaft, so that the shape precision is increased.

In step S3, a polishing operation is performed on the surface whose shape has thus been ground to a shape that is close to the desired shape, in order to remove fine roughness and unevenness and thus produce a clean mirror surface. In this step, an elastic polishing tool is caused to rub against the surface being polished with a polishing agent interposed, thus producing a surface that exhibits a surface roughness and unevenness below the prescribed values.

In step S4, measurement of the surface shape is then performed in order to ascertain whether or not the surface has the prescribed shape. Specifically, in step S4, the workpiece (corresponding to the detected lens 3) is placed in the optical system 101, as shown in FIG. 2, and the non-spherical surface shape is measured by means of the non-spherical surface shape measuring device 101. In step S5, a determination is made as to whether or not the surface precision of the measured non-spherical surface shape has reached the target value. If it is determined that a sufficient surface precision has been obtained, the manufacturing process is completed. On the other hand, if it is determined that the surface precision is insufficient the process proceeds to step S6 and corrective polishing is performed. In the corrective polishing step, re-polishing for the purpose of correcting the surface shape is performed with reference to the surface shape measurement results obtained in step S4, after which the operation returns to step S4. The desired non-spherical surface shape is formed by repeating corrective polishing until a sufficient surface precision is obtained.

In the manufacturing method of the present embodiment, corrective polishing is performed while applying feedback based on measurement results obtained using the non-spherical shape measuring device of the present invention. Accordingly, high-precision shape measurements can be performed in a short time, so that the efficiency of the overall manufacturing process can be improved. Furthermore, optical members with non-spherical surfaces that have a high-precision surface shape can be manufactured.

The non-spherical surface shape measuring device of the present invention makes it possible to correct, with a high degree of precision, the relative deviation values between the shape of an examined surface and the shape of a reference surface by accurately ascertaining the relative displacement between the examined surface and reference surface. Accordingly, the shape of the examined surface can be accurately measured regardless of the alignment of the examined surface.

Additionally, in the method of the present invention for manufacturing optical members with non-spherical surface shapes, non-spherical surface shapes are measured using the non-spherical surface shape measuring device of the present invention. Accordingly, optical members with high-precision non-spherical surfaces can be manufactured.

It will be apparent to those skilled in the art that various modifications and variations can be made in the non-spherical surface shape measuring device of the present invention without departing from the spirit or scope of the invention. Thus, it is intended that the present invention cover the modifications and variations of this invention provided they come within the scope of the appended claims and their equivalents.

What is claimed is:

1. A non-spherical surface shape measuring device that measures shapes of object surfaces having rotationally symmetrical non-spherical surface shapes, comprising:
   a measuring means for obtaining relative deviation values between a reference surface and an object surface by measuring corresponding sampling points on the surfaces of the reference surface and the object surface, wherein predetermined coefficients of variables are stored prior to measurement;
   a first operating means for approximating partial differential coefficients for predetermined variables modeling a relative displacement between the object surface and the reference surface and XY-coordinate values of the sampling points into functional equivalents of the partial differential coefficients;
   a second operating means for approximating the relative displacement between the object surface and the reference surface; and
   a third operating means for correcting the relative deviation values according to the relative displacement approximated by the second operating means.

2. The non-spherical surface shape measuring device according to claim 1, wherein the first operating means further includes:
   means for performing a plurality of coordinate-transformations independently for each of the predetermined variables; and
   means for approximating functional equivalents for the relative deviation values between the object surface and the reference surface by differentiating the each of the predetermined variables, and then summing the results.

3. The non-spherical surface shape measuring device according to claim 2, wherein the first operating means further includes:
   means for determining functional equivalents of partial differential coefficients for an inclination angle variable, expressing an inclination of the non-spherical surface shape with respect to an axis of rotational symmetry, among the predetermined variables describing the relative displacement between the object surface and the reference surface;
   means for correlating the XY-coordinate values before and after a coordinate transformation performed for the inclination angle variables with respect to at least one coordinate axis; and
   means for functionally determining coefficient values for each order of the inclination angle variables.

4. The non-spherical surface shape measuring device according to claim 3, wherein the first operating means functionally determines the coefficient values expressing the inclination angle by functionally determining the partial differential coefficients by partially performing partial differentiating with the inclination angle variables, the coordinate-transformation variables and incorporating any correlation equivalents.

5. The non-spherical surface shape measuring device according to claim 4, wherein the measuring means measures light path difference data of light paths formed by the object surface and the reference surface as the relative deviation values.

6. The non-spherical surface shape measuring device according to claim 4, wherein the measuring means obtains the relative deviation values by measuring the shape of the object surface as XYZ-orthogonal coordinates of sampling points, and subtracting reference calculated data corresponding to the reference surface from the measured XYZ-orthogonal coordinates.

7. The non-spherical surface shape measuring device according to claim 3, wherein the measuring means measures light path difference data of light paths formed by the object surface and the reference surface as the relative deviation values.

8. The non-spherical surface shape measuring device according to claim 3, wherein the measuring means obtains the relative deviation values by measuring the shape of the object surface as XYZ-orthogonal coordinates of sampling points, and subtracting reference calculated data corresponding to the reference surface from the measured XYZ-orthogonal coordinates.

9. The non-spherical surface shape measuring device according to claim 1, wherein the first operating means further includes:

means for determining functional equivalents of partial differential coefficients for an inclination angle variable, expressing an inclination of the non-spherical surface shape with respect to an axis of rotational symmetry, among the predetermined variables describing the relative displacement between the object surface and the reference surface;

means for correlating the XY-coordinate values before and after a coordinate transformation performed for the inclination angle variables with respect to at least one coordinate axis; and means for functionally determining coefficient values for each order of the inclination angle variables.

10. The non-spherical surface shape measuring device according to claim 9, wherein the first operating means functionally determines the coefficient values expressing the inclination angle by functionally determining the partial differential coefficients by partially performing partial differentiating with the inclination angle variables, the coordinate-transformation variables and incorporating any correlation equivalents.

11. The non-spherical surface shape measuring device according to claim 10, wherein the measuring means measures light path difference data of light paths formed by the object surface and the reference surface as the relative deviation values.

12. The non-spherical surface shape measuring device according to claim 9, wherein the measuring means measures light path difference data of light paths formed by the object surface and the reference surface as the relative deviation values.

13. The non-spherical surface shape measuring device according to claim 1, wherein the measuring means measures light path difference data of light paths formed by the object surface and the reference surface as the relative deviation values.

14. The non-spherical surface shape measuring device according to claim 1, wherein the measuring means obtains the relative deviation values by measuring the shape of the object surface as XYZ-orthogonal coordinates of sampling points, and subtracting reference calculated data corresponding to the reference surface from the measured XYZ-orthogonal coordinates.

15. A non-spherical surface shape measuring method for measuring shapes of object surfaces having rotationally symmetrical non-spherical surface shapes, comprising the steps of:

measuring relative deviations between a reference surface and an object surface by measuring corresponding sampling points on the surfaces of the reference surface and the object surface and storing predetermined coefficients of variables prior to measurement;

approximating partial differential coefficients for predetermined variables modeling a relative displacement between the object surface and the reference surface and XY-coordinate values of the sampling points into functional equivalents of the partial differential coefficients;

approximating the relative displacement between the object surface and the reference surface; and correcting the relative deviation values according to the relative displacement approximated.

16. The non-spherical surface shape measuring method according to claim 15, wherein the step of approximating partial differential coefficients further includes the steps of:

performing a plurality of coordinate-transformations independently for each of the predetermined variables; and approximating functional equivalents for the relative deviation values between the object surface and the reference surface by differentiating the each of the predetermined variables, and then summing the results.

17. The non-spherical surface shape measuring method according to claim 16, wherein the step of approximating partial differential coefficients further includes the steps of:

determining functional equivalents of partial differential coefficients for an inclination angle variable, expressing an inclination of the non-spherical surface shape with respect to an axis of rotational symmetry, among the predetermined variables describing the relative displacement between the object surface and the reference surface;

correlating the XY-coordinate values before and after a coordinate transformation performed for the inclination angle variables with respect to at least one coordinate axis; and functionally determining coefficient values for each order of the inclination angle variables.

18. The non-spherical surface shape measuring method according to claim 17, wherein the step of approximating partial differential coefficients further includes the step of functionally determining the coefficient values expressing the inclination angle by functionally determining the partial differential coefficients by partially performing partial differentiating with the inclination angle variables, the coordinate-transformation variables and incorporating any correlation equivalents.

19. The non-spherical surface shape measuring method according to claim 18, wherein the step of measuring relative deviations further includes the step of measuring light path difference data of light paths formed by the object surface and the reference surface as the relative deviation values.

20. The non-spherical surface shape measuring method according to claim 18, wherein the step of measuring relative deviations further includes the step of measuring the shape of the object surface as XYZ-orthogonal coordinates of sampling points, and subtracting reference calculated data corresponding to the reference surface from the measured XYZ-orthogonal coordinates.

21. The non-spherical surface shape measuring method according to claim 17, wherein the step of measuring relative deviations further includes the step of measuring light path difference data of light paths formed by the object surface and the reference surface as the relative deviation values.

22. The non-spherical surface shape measuring method according to claim 17, wherein the step of measuring relative deviations further includes the step of measuring the shape of the object surface as XYZ-orthogonal coordinates of sampling points, and subtracting reference calculated data corresponding to the reference surface from the measured XYZ-orthogonal coordinates.

23. The non-spherical surface shape measuring method according to claim 15, further including the steps of:
   determining functional equivalents of partial differential coefficients for an inclination angle variable, expressing an inclination of the non-spherical surface shape with respect to an axis of rotational symmetry, among the predetermined variables describing the relative displacement between the object surface and the reference surface;
   correlating the XY-coordinate values before and after a coordinate transformation performed for the inclination angle variables with respect to at least one coordinate axis; and
   functionally determining coefficient values for each order of the inclination angle variables.

24. The non-spherical surface shape measuring method according to claim 23, wherein the step of functionally determining the coefficient values expressing the inclination angle includes the step of functionally determining the partial differential coefficients by partially performing partial differentiating with the inclination angle variables, the coordinate-transformation variables and incorporating any correlation equivalents.

25. The non-spherical surface shape measuring method according to claim 24, wherein the step of measuring relative deviations further includes the step of measuring light path difference data of light paths formed by the object surface and the reference surface as the relative deviation values.

26. The non-spherical surface shape measuring method according to claim 23, wherein the step of measuring relative deviations further includes the step of measuring light path difference data of light paths formed by the object surface and the reference surface as the relative deviation values.

27. The non-spherical surface shape measuring method according to claim 15, wherein the step of measuring relative deviations further includes the step of measuring light path difference data of light paths formed by the object surface and the reference surface as the relative deviation values.

28. The non-spherical surface shape measuring method according to claim 15, wherein the step of measuring relative deviations further includes the step of measuring relative deviations by measuring the shape of the object surface as XYZ-orthogonal coordinates of sampling points, and subtracting reference calculated data corresponding to the reference surface from the measured XYZ-orthogonal coordinates.

29. A method for manufacturing optical members with non-spherical surfaces, the method comprising:
   measuring a non-spherical surface shape, wherein the non-spherical surface is measured using a non-spherical surface shape measuring device comprised of:
      a measuring means for obtaining relative deviation values between a reference surface and an object surface by measuring corresponding sampling points on the surfaces of the reference surface and the object surface and storing predetermined coefficients of variables prior to measurement;
      a first operating means for approximating partial differential coefficients for predetermined variables modeling a relative displacement between the object surface and the reference surface and XY-coordinate values of the sampling points into functional equivalents of the partial differential coefficients;
      a second operating means for approximating the relative displacement between the object surface and the reference surface;
      a third operating means for correcting the relative deviation values according to the relative displacement approximated by the second operating means; and
   polishing the non-spherical surface based on measurement results obtained in the non-spherical surface shape measurement step.

30. The method for manufacturing optical members with non-spherical surfaces according to claim 29, further including the steps of:
   performing a plurality of coordinate-transformations independently for each of the predetermined variables; and
   approximating functional equivalents for the relative deviation values between the object surface and the reference surface by differentiating the each of the predetermined variables, and then summing the results.

31. The method for manufacturing optical members with non-spherical surfaces, according to claim 30, wherein the step of determining functional equivalents of partial differential coefficients for an inclination angle variables further includes the steps of:
   expressing an inclination of the non-spherical surface shape with respect to an axis of rotational symmetry, among the predetermined variables describing the relative displacement between the object surface and the reference surface;
   correlating the XY-coordinate values before and after a coordinate transformation performed for the inclination angle variables with respect to at least one coordinate axis; and
   functionally determining coefficient values for each order of the inclination angle variables.

32. The method for manufacturing optical members with non-spherical surfaces, according to claim 31, wherein the step of functionally determining the coefficient values expressing the inclination angle further includes functionally determining the partial differential coefficients by partially performing partial differentiating with the inclination angle variables, the coordinate-transformation variables and incorporating any correlation equivalents.

33. The method for manufacturing optical members with non-spherical surfaces according to claim 32, further including the step of measuring light path difference data of light paths formed by the object surface and the reference surface as the relative deviation values.

34. The method for manufacturing optical members with non-spherical surfaces according to claim 32, further including the steps of obtaining the relative deviation values by measuring the shape of the object surface as XYZ-orthogonal coordinates of sampling points, and subtracting reference calculated data corresponding to the reference surface from the measured XYZ-orthogonal coordinates.

35. The method for manufacturing optical members with non-spherical surfaces according to claim 31, further including the step of measuring light path difference data of light paths formed by the object surface and the reference surface as the relative deviation values.

36. The method for manufacturing optical members with non-spherical surfaces according to claim 31, further including the steps of obtaining the relative deviation values by measuring the shape of the object surface as XYZ-orthogonal coordinates of sampling points, and subtracting reference calculated data corresponding to the reference surface from the measured XYZ-orthogonal coordinates.

37. The method for manufacturing optical members with non-spherical surfaces according to claim 29, further including the steps of:

determining functional equivalents of partial differential coefficients for an inclination angle variable, expressing an inclination of the non-spherical surface shape with respect to an axis of rotational symmetry, among the predetermined variables describing the relative displacement between the object surface and the reference surface;

correlating the XY-coordinate values before and after a coordinate transformation performed for the inclination angle variables with respect to at least one coordinate axis; and functionally determining coefficient values for each order of the inclination angle variables.

38. The method for manufacturing optical members with non-spherical surfaces according to claim 37, wherein the step of functionally determining the coefficient values expressing the inclination angle further includes functionally determining the partial differential coefficients by partially performing partial differentiating with the inclination angle variables, the coordinate-transformation variables and incorporating any correlation equivalents.

39. The method for manufacturing optical members with non-spherical surfaces according to claim 38, further including the step of measuring light path difference data of light paths formed by the object surface and the reference surface as the relative deviation values.

40. The method for manufacturing optical members with non-spherical surfaces according to claim 37, further including the step of measuring light path difference data of light paths formed by the object surface and the reference surface as the relative deviation values.

41. The method for manufacturing optical members with non-spherical surfaces according to claim 29, further including the step of measuring light path difference data of light paths formed by the object surface and the reference surface as the relative deviation values.

42. The method for manufacturing optical members with non-spherical surfaces according to claim 29, further including the steps of obtaining the relative deviation values by measuring the shape of the object surface as XYZ-orthogonal coordinates of sampling points, and subtracting reference calculated data corresponding to the reference surface from the measured XYZ-orthogonal coordinates.

* * * * *